US010268716B2

(12) United States Patent
Alshammari

(10) Patent No.: US 10,268,716 B2
(45) Date of Patent: Apr. 23, 2019

(54) ENHANCED HADOOP FRAMEWORK FOR BIG-DATA APPLICATIONS

(71) Applicant: Hamoud Alshammari, Milford, CT (US)

(72) Inventor: Hamoud Alshammari, Milford, CT (US)

(*) Notice: Subject to any disclaimer, the term of this patent is extended or adjusted under 35 U.S.C. 154(b) by 439 days.

(21) Appl. No.: 15/141,101

(22) Filed: Apr. 28, 2016

(65) Prior Publication Data
US 2016/0321310 A1 Nov. 3, 2016

Related U.S. Application Data

(60) Provisional application No. 62/155,267, filed on Apr. 30, 2015.

(51) Int. Cl.
G06F 17/30 (2006.01)
(52) U.S. Cl.
CPC .. *G06F 17/30345* (2013.01); *G06F 17/30424* (2013.01)
(58) Field of Classification Search
None
See application file for complete search history.

(56) References Cited

U.S. PATENT DOCUMENTS

| 8,972,986 | B2 | 3/2015 | Palanisamy et al. | |
|---|---|---|---|---|
| 2014/0047422 | A1 | 2/2014 | Ravi et al. | |
| 2018/0041477 | A1* | 2/2018 | Shaposhnik | G06F 9/45545 |
| 2018/0081798 | A1* | 3/2018 | Alcantara | G06F 17/30557 |

FOREIGN PATENT DOCUMENTS

WO   WO 2015/041735 A1   3/2015

OTHER PUBLICATIONS

Hamoud Alshammari, et al., "Improving Current Hadoop MapReduce Workflow and Performance", International Journal of Computer Applications (0975-8887), vol. 116, No. 15, Apr. 2015, pp. 38-42.
Hamoud Alshammari, et al., "Hadoop Based Enhanced Cloud Architecture for Bioinformatic Algorithms", IEEE Long Island Systems, Applications and Technology Conference (LISAT), May 2014, 5 pages.

(Continued)

*Primary Examiner* — Belix M Ortiz Ditren
(74) *Attorney, Agent, or Firm* — Maier & Maier, PLLC

(57) ABSTRACT

Described herein are a server and a method for processing Big-Data. The server receives source data that is uploaded to processing nodes. The server maintains a data structure corresponding to a plurality of previously submitted jobs to the server, the data structure including at least one a job identifier, at least one sequence of text associated with the at least one job identifier, and a list of processing nodes associated with the at least one sequence of text. The server receives a subsequent job including a job name from a client node and determines whether the job name matches the job identifier. The server allocates based on the determination, only the list of processing nodes corresponding to the matched identifier to the subsequent job and further updates the data structure.

20 Claims, 9 Drawing Sheets
Specification includes a Sequence Listing.

(56) References Cited

OTHER PUBLICATIONS

Jeffrey Dean, et al., "MapReduce: Simplified Data Processing on Large Clusters", http://static.googleusercontent.com/media/research.google.com/en//archive/mapreduce-osdiO4.pdf, 2004, 13 pages.

Matthew Malensek, et al., "Alleviation of Disk I/O Contention in Virtualized Settings for Data-Intensive Computing", IEEE/ACM International Symposium on Big Data Computing, 2015, 10 pages.

Hamoud Alshammari, et al., "Hadoop Based Enhanced Cloud Architecture", ASEE, 2014, 4 pages.

Hamoud Alshammari, et al., "Enhancing Performance of Hadoop and Mapreduce for Scientific Data using NoSQL Database", IEEE Long Island Systems, Applications and Technology (LISAT), May 2015, 4 pages.

Hamoud Alshammari, et al., "H2Hadoop: Improving Hadoop Performance using the Metadata of Related Jobs", IEEE Transactions on Cloud Computing, 2016, 11 pages.

\* cited by examiner

SEQUENCE LISTING

<160> NUMBER OF SEQ ID NOS: 14

<210> SEQ ID NO 1
<211> LENGTH: 9
<212> TYPE: DNA
<213> ORGANISM: Artificial Sequence
<220> FEATURE:
<223> OTHER INFORMATION: misc_structure

<400> SEQUENCE: 1 ggggcgggg                                                                9

<210> SEQ ID NO 2
<211> LENGTH: 15
<212> TYPE: DNA
<213> ORGANISM: Artificial Sequence
<220> FEATURE:
<223> OTHER INFORMATION: misc_structure

<400> SEQUENCE: 2
aagacggtgg taagg                                                        15

<210> SEQ ID NO 3
<211> LENGTH: 14
<212> TYPE: DNA
<213> ORGANISM: Artificial Sequence
<220> FEATURE:
<223> OTHER INFORMATION: misc_structure

<400> SEQUENCE: 3
catttctgct aaga                                                         14

<210> SEQ ID NO 4
<211> LENGTH: 15
<212> TYPE: DNA
<213> ORGANISM: Artificial Sequence
<220> FEATURE:
<223> OTHER INFORMATION: misc_structure

<400> SEQUENCE: 4
gaatgtcctt tctct                                                        15

<210> SEQ ID NO 5
<211> LENGTH: 19
<212> TYPE: DNA
<213> ORGANISM: Artificial Sequence
<220> FEATURE:
<223> OTHER INFORMATION: misc_structure

<400> SEQUENCE: 5
gatctcagcc agtgtgaaa                                                    19

<210> SEQ ID NO 6
<211> LENGTH: 8
<212> TYPE: DNA
<213> ORGANISM: Artificial Sequence
<220> FEATURE:
<223> OTHER INFORMATION: misc_structure

<400> SEQUENCE: 6 gggattta                                                                 8

<210> SEQ ID NO 7
<211> LENGTH: 6
<212> TYPE: DNA
<213> ORGANISM: Artificial Sequence

```
<220> FEATURE:
<223> OTHER INFORMATION: misc_structure

<400> SEQUENCE: 7 tttaga                                                                    6

<210> SEQ ID NO 8
<211> LENGTH: 7
<212> TYPE: DNA
<213> ORGANISM: Artificial Sequence
<220> FEATURE:
<223> OTHER INFORMATION: misc_structure

<400> SEQUENCE: 8 tttagcc                                                                   7

<210> SEQ ID NO 9
<211> LENGTH: 8
<212> TYPE: DNA
<213> ORGANISM: Artificial Sequence
<220> FEATURE:
<223> OTHER INFORMATION: misc_structure

<400> SEQUENCE: 9 gccattaa                                                                  8

<210> SEQ ID NO 10
<211> LENGTH: 8
<212> TYPE: DNA
<213> ORGANISM: Artificial Sequence
<220> FEATURE:
<223> OTHER INFORMATION: misc_structure

<400> SEQUENCE: 10 aatccagg                                                                  8

<210> SEQ ID NO 11
<211> LENGTH: 13
<212> TYPE: DNA
<213> ORGANISM: Artificial Sequence
<220> FEATURE:
<223> OTHER INFORMATION: misc_structure

<400> SEQUENCE: 11
tttagatcta aat                                                           13

<210> SEQ ID NO 12
<211> LENGTH: 6
<212> TYPE: DNA
<213> ORGANISM: Artificial Sequence
<220> FEATURE:
<223> OTHER INFORMATION: misc_structure

<400> SEQUENCE: 12 ggtagg                                                                    6

<210> SEQ ID NO 13
<211> LENGTH: 9
<212> TYPE: DNA
<213> ORGANISM: Artificial Sequence
<220> FEATURE:
<223> OTHER INFORMATION: misc_structure

<400> SEQUENCE: 13 attggctat                                                                 9
```

-continued

```
<210> SEQ ID NO 14
<211> LENGTH: 9
<212> TYPE: DNA
<213> ORGANISM: Artificial Sequence
<220> FEATURE:
<223> OTHER INFORMATION: misc_structure

<400> SEQUENCE: 14 attcgcagc                                                              9
```

ENHANCED HADOOP FRAMEWORK FOR BIG-DATA APPLICATIONS

CROSS-REFERENCE TO RELATED APPLICATIONS

This application is based upon and claims the benefit of priority to provisional U.S. Application No. 62/155,267, filed Apr. 30, 2015, the entire contents of which are incorporated herein by reference.

GRANT OF NON-EXCLUSIVE RIGHT

This application was prepared with financial support from the Saudia Arabian Cultural Mission, and in consideration therefore the present inventor(s) has granted The Kingdom of Saudi Arabia a non-exclusive right to practice the present invention.

BACKGROUND

Field of the Disclosure

The present disclosure relates to a framework for processing Big-Data. Specifically, the disclosure is related to an enhanced Hadoop framework that improves the processing functionality of Big-Data that is implemented in a cluster of data processing nodes.

Description of the Related Art

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Hadoop is a new technology that provides processing services for Big-Data issues in cloud computing. Many studies have discussed and developed different ways to improve the Hadoop Map-Reduce performance from different considerations or aspects. Many studies have discussed optimizing Hadoop and Map-Reduce jobs such as job scheduling and execution time to improve Hadoop performance. Some studies have also discussed data locality in cloud computing.

One of the important features of Hadoop is the process of job scheduling and job execution time. Different studies have provided some improvement information that show positive results based on a certain set of assumptions. Others focus on the time of initialization and termination phases of MapReduce jobs. System memory has many issues that could be addressed to improve the system performance. In Hadoop, Apache performs a centralized memory approach which is implemented to control the cashing and resources. Apache Hadoop supports centralized data cashing. However, some studies utilize a distributed cashing approach to improve Hadoop performance. There are different approaches that discuss memory issue. One such technique referred to as Shm-Streaming' introduces a shared memory streaming schema to provide lockless FIFO queue that connects Hadoop and external programs.

The location of input data has been determined in current Hadoop to be located in different nodes in the cluster. Hadoop distributes duplicated data into different nodes in different network racks. Such a strategy helps for various reasons, one of which is for false tolerant issue to have more reliability and scalability. However, the default data distribution location strategy causes some poor performance in terms of mapping and reducing tasks.

Accordingly, there is a requirement for an improved Hadoop framework which enables identification of blocks in the cluster where certain information is stored. Specifically, there is a requirement for a framework which manages Big-Data applications and improves the overall performance of the system.

SUMMARY

Cloud computing leverages Hadoop framework for processing Big-Data in parallel. Hadoop has certain limitations that may be exploited to execute job (tasks) in an efficient manner. The limitations of a typical Hadoop framework (referred to herein as a native Hadoop framework) are primarily due to factors such as data locality in the cluster, jobs and tasks scheduling, and resource allocations in Hadoop.

Efficient resource allocation remains a challenge in cloud computing Map-Reduce platforms. Accordingly, one aspect of the present disclosure provides for an enhanced Hadoop framework (referred to herein as H2Hadoop), which reduces the computation cost associated with Big-Data analysis. The enhanced framework also addresses the issue of resource allocation of native Hadoop. H2Hadoop provides an improved solution for "text data", such as finding DNA sequence and the motif of a DNA sequence. Additionally, H2Hadoop provides an efficient data-mining approach for cloud computing environments.

The H2Hadoop architecture described herein leverages on a server's (referred to herein as Name-Node) ability to assign jobs to the processing nodes (referred to herein as Task-Trackers or Data-Nodes) within the cluster. By adding control features to the Name-Node, H2Hadoop can intelligently direct and assign tasks to the Data-Nodes that contain the required data without sending the job to the whole cluster. By one aspect of the present disclosure, H2Hadoop reduces CPU time, number of read operations, and another Hadoop factors.

An embodiment of the present disclosure provides for a server comprising: circuitry configured to receive source data that is to be uploaded to a plurality of processing nodes, partition the received source data into a plurality of data-blocks, each data block having a fixed size, and being replicated a predetermined number of times, upload the partitioned and replicated data-blocks to the processing nodes, each replicated data block being stored in a unique processing node, maintain a first data structure corresponding to a plurality of previously submitted jobs to the server, the first data structure including at least one a job identifier, at least one sequence of text associated with the at least one job identifier, and a list of processing nodes associated with the at least one sequence of text, each sequence of text stored in the first data structure having a length that is based on a likelihood of occurrence of the sequence of text, receive a subsequent job including a job name from a client node, determine whether the job name matches the job identifier stored in the first data structure, allocate based on the determination, only the list of processing nodes corresponding to the matched identifier to the subsequent job, and update the first data structure by computing for each sequence of text a lifespan parameter, the lifespan parameter for each sequence of text being computed based on a reuse factor of the sequence of text.

An embodiment of the present disclosure provides for a method performed by a server including circuitry, the method comprising: receiving source data that is to be uploaded to a plurality of processing nodes; partitioning by circuitry, the received source data into a plurality of data-blocks, each data block having a fixed size, and being replicated a predetermined number of times; uploading the partitioned and replicated data-blocks to the processing nodes, each replicated data block being stored in a unique processing node; maintaining a first data structure corresponding to a plurality of previously submitted jobs to the server, the first data structure including at least one a job identifier, at least one sequence of text associated with the at least one job identifier, and a list of processing nodes associated with the at least one sequence of text, each sequence of text stored in the first data structure having a length that is based on a likelihood of occurrence of the sequence of text; receiving a subsequent job including a job name from a client node; determining whether the job name matches the job identifier stored in the first data structure; allocating based on the determination, only the list of processing nodes corresponding to the matched identifier to the subsequent job; and updating by circuitry, the first data structure by computing for each sequence of text a lifespan parameter, the lifespan parameter for each sequence of text being computed based on a reuse factor of the sequence of text.

An embodiment of the present disclosure provides for a non-transitory computer readable medium including computer executable instructions, wherein the instructions, when executed by a computer, cause the computer to perform a method comprising: receiving source data that is to be uploaded to a plurality of processing nodes; partitioning the received source data into a plurality of data-blocks, each data block having a fixed size, and being replicated a predetermined number of times; uploading the partitioned and replicated data-blocks to the processing nodes, each replicated data block being stored in a unique processing node; maintaining a first data structure corresponding to a plurality of previously submitted jobs to the server, the first data structure including at least one a job identifier, at least one sequence of text associated with the at least one job identifier, and a list of processing nodes associated with the at least one sequence of text, each sequence of text stored in the first data structure having a length that is based on a likelihood of occurrence of the sequence of text; receiving a subsequent job including a job name from a client node; determining whether the job name matches the job identifier stored in the first data structure; allocating based on the determination, only the list of processing nodes corresponding to the matched identifier to the subsequent job; and updating the first data structure by computing for each sequence of text a lifespan parameter, the lifespan parameter for each sequence of text being computed based on a reuse factor of the sequence of text.

The foregoing paragraphs have been provided by way of general introduction, and are not intended to limit the scope of the following claims. The described embodiments together, with further advantages, will be best understood by reference to the following detailed description taken in conjunction with the accompanying drawings.

BRIEF DESCRIPTION OF THE DRAWINGS

Various embodiments of this disclosure that are provided as examples will be described in detail with reference to the following figures, wherein like numerals reference like elements, and wherein.

DETAILED DESCRIPTION OF THE EMBODIMENTS

Figure 1:
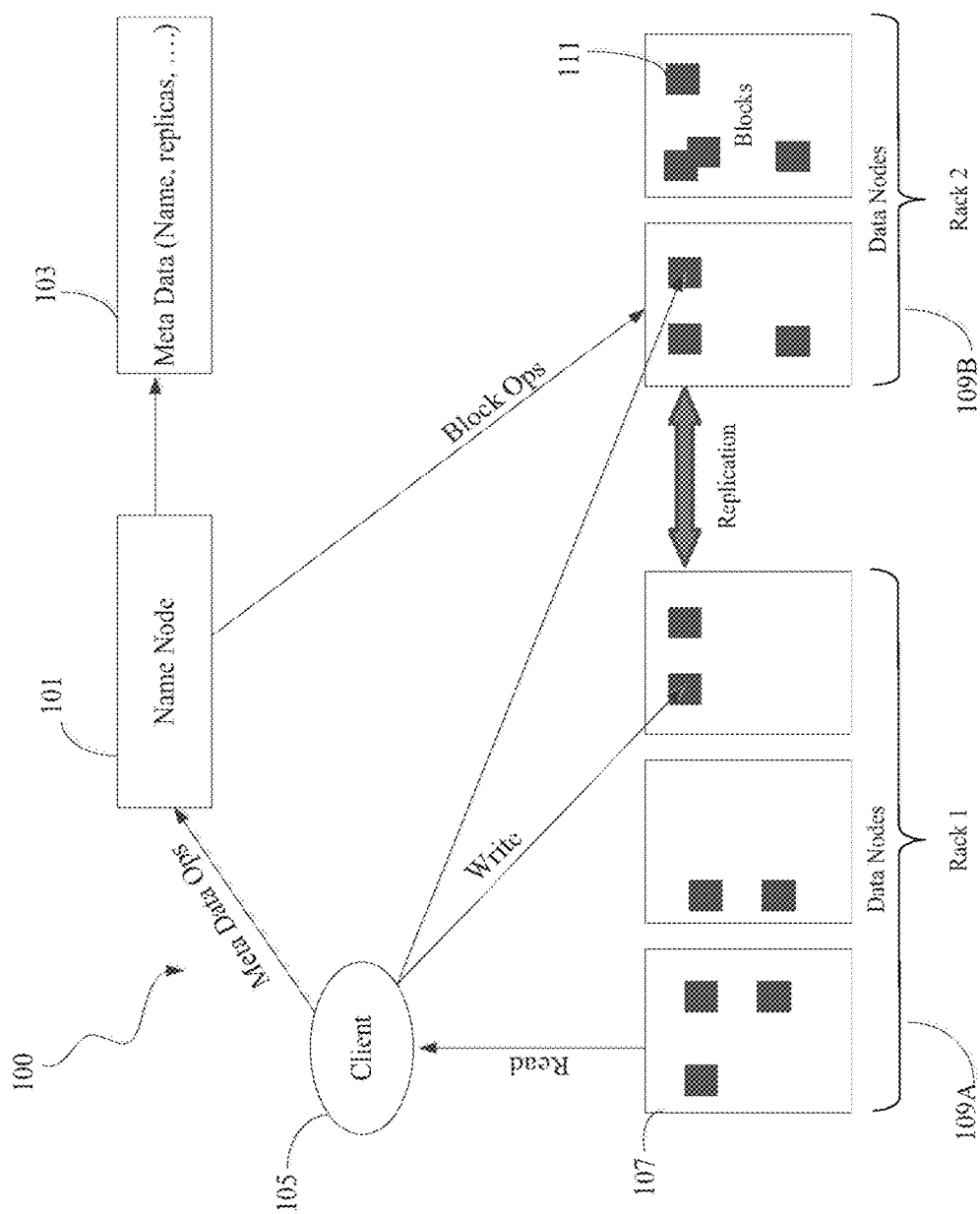
FIG. 1 illustrates according to an embodiment, an exemplary Hadoop file system.

Exemplary embodiments are illustrated in the referenced figures of the drawings. It is intended that the embodiments and figures disclosed herein are to be considered illustrative rather than restrictive. No limitation on the scope of the technology and of the claims that follow is to be imputed to the examples shown in the drawings and discussed herein.

The embodiments are mainly described in terms of particular processes and systems provided in particular implementations. However, the processes and systems will operate effectively in other implementations. Phrases such as "an embodiment", "one embodiment" and "another embodiment" may refer to the same or different embodiments. The embodiments will be described with respect to methods and compositions having certain components. However, the methods and compositions may include more or less components than those shown, and variations in the arrangement and type of the components may be made without departing from the scope of the present disclosure.

The exemplary embodiments are described in the context of methods having certain steps. However, the methods and compositions operate effectively with additional steps and steps in different orders that are not inconsistent with the exemplary embodiments. Thus, the present disclosure is not intended to be limited to the embodiments shown, but is to be accorded the widest scope consistent with the principles and features described herein and as limited only by appended claims.

Furthermore, where a range of values is provided, it is to be understood that each intervening value between an upper and lower limit of the range—and any other stated or intervening value in that stated range is encompassed within the disclosure. Where the stated range includes upper and lower limits, ranges excluding either of those limits are also included. Unless expressly stated, the terms used herein are intended to have the plain and ordinary meaning as understood by those of ordinary skill in the art. The following definitions are intended to aid the reader in understanding the present disclosure, but are not intended to vary or otherwise limit the meaning of such terms unless specifically indicated.

In what follows is provided initially a description of a Hadoop framework followed by a description of an exemplary Hadoop file system.

By one embodiment, Hadoop is an Apache open-source software framework that is written in Java for distributed storage and distributed processing. Hadoop provides solutions for Big-Data processing and analysis applications. Hadoop includes a file system that provides an interface between the users' applications and the local file system, which is the Hadoop Distributed File System HDFS (described later with reference to FIG. 1). Hadoop distributed File System assures reliable sharing of the resources for efficient data analysis.

Figure 2:
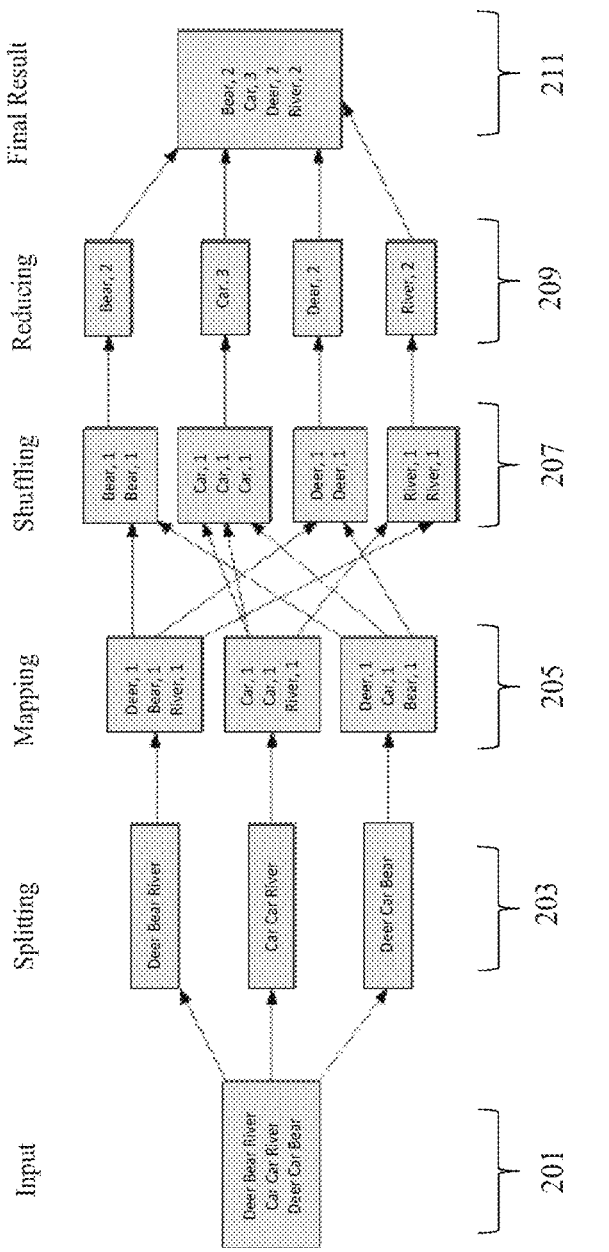
FIG. 2 depicts an exemplary example illustrating a Map-Reduce job.

In an embodiment of the present disclosure, the two main components of Hadoop are (i) Hadoop Distributed File System (HDFS) that provides the data reliability (distributed storage) and (ii) MapReduce that provides the system analysis (distributed processing), as described later with reference to FIG. 2. Based on the principle that "moving computation towards data is cheaper than moving data towards computation", Hadoop employs HDFS to store large data files across the cluster.

MapReduce provides stream reading access, runs tasks on a cluster of nodes, and provides a data managing system for a distributed data storage system. MapReduce algorithm as described herein may be used for applications such as generating search indexes, document clustering, access log analysis, and different other kinds of data analysis. "Write-once and read-many" is an approach that permits data files to be written only once in HDFS and then allows the files to be read many times over with respect to the numbers of assigned jobs. By one embodiment, during the writing process, Hadoop divides the data into blocks with a predefined block size. The blocks are further written and duplicated in the HDFS. The blocks can be duplicated a number of times based on a specific value, which is set to 3 times by default.

According to one embodiment, in HDFS, the cluster that Hadoop is installed in is divided into two main components, which are (i) the master node (i.e., the server node) called Name-Node and (ii) the slaves called Data-Nodes. In Hadoop cluster, single Name-Node is responsible for overall management of the file system including saving the data, and directing the jobs to the appropriate Data-Nodes that store related application data. Data-Nodes facilitate Hadoop/MapReduce to process the jobs with streaming execution in a parallel processing environment.

Running on the master node, a Job-Tracker coordinates and deploys the applications to the Data-Nodes with Task-Tracker services for execution and parallel processing. Each task is executed in an available slot in a Data-Node, which is configured with a fixed number of map slots, and another fixed number of reduced slots. The data in Map-Reduce for instance, may be in a text format, so that both the input and output of data must also be in a text file format. By one embodiment, the master computer has two daemons, which are Name-Node corresponding to the HDFS and Job-Tracker in terms of MapReduce functionality. Similarly, the slave nodes also have two daemons, which are Data-Nodes in terms of HDFS and Task-Trackers in terms of Map-Reduce functionality.

Turning to FIG. 1 is depicted an exemplary Hadoop File System (HDFS) 100. The Hadoop File System is developed using a distributed file system design. HDFS is run on commodity hardware, and unlike other distributed systems, HDFS is highly fault tolerant and designed using low-cost hardware. HDFS holds very large amount of data and provides seamless data access. To store such huge amounts of data, the files are stored across multiple machines. The files are stored in a redundant fashion to rescue the system from possible data losses in case of failure. HDFS also makes applications available to parallel processing.

Additionally, HDFS incurs the following advantageous features: (a) it is suitable for distributed storage and processing, (b) Hadoop provides a command interface to interact with HDFS, (c) the built-in servers of Name-node and Data-Node help users to easily check the status of cluster, (d) Hadoop provides streaming access to file system data, and (e) HDFS provides for file permissions and authentication.

The HDFS 100 includes a client node 105, a Name-Node 101 (i.e., a server), a metadata file 103, and racks of Data-Nodes (Rack 1 and Rack 2) 109A and 109B, respectively. According to an embodiment, HDFS follows a master-slave architecture and includes the following elements: Name-Node 101, Data-Nodes included in racks 109A and 109B and Blocks 111. The Name-Node 101 is a commodity hardware that includes the GNU/Linux operating system and the Name-Node software. For instance, Name-Node may be software that can be run on commodity hardware. The system having the Name-Node 101 acts as the master server and performs the following tasks: manages the file system namespace, regulates client's access to files, and also executes file system operations such as renaming, closing, and opening files and directories.

The Data-Node(s) is a commodity hardware having the GNU/Linux operating system and Data-Node software. For every node (Commodity hardware/System) in a cluster, there is a Data-Node. These nodes manage the data storage of the system and perform the following operations: (a) Data-Nodes perform read-write operations on the file systems, as per client request, and (b) Data-Nodes also perform operations such as block creation, deletion, and replication according to the instructions of the Name-Node.

Furthermore, user data is stored in the files of HDFS. By one embodiment, the file in a file system may be divided into one or more segments and/or stored in individual data nodes. Such file segments are called as blocks 111. In other words, the minimum amount of data that HDFS can read or write is called a Block 111. For instance, the default block size may be 64 MB, but the size can be increased as per the need to change in HDFS configuration.

By one embodiment of the present disclosure, the goals of the HDFS are: (a) Fault detection and recovery—since HDFS includes a large number of commodity hardware, failure of components may be frequent. Therefore HDFS includes mechanisms for quick and automatic fault detection and recovery, (b) Huge datasets—HDFS may have hundreds of nodes per cluster to manage the applications having huge datasets, and (c) hardware at data—a requested task can be performed efficiently when the computation takes place near the data. Specifically, where huge datasets are involved, the hardware at data reduces the network traffic and increases the throughput of the system.

Parallel processing in cloud computing has emerged as an interdisciplinary research area due to the heterogeneous nature and large size of data. Translating sequential data to meaningful information requires substantial computational power and efficient algorithms to identify the degree of similarities among multiple sequences. Sequential pattern mining or data analysis applications such as, DNA sequence aligning and motif finding usually require large and complex amounts of data processing and computational capabilities. Efficiently targeting and scheduling of computational resources is required to solve such complex problems.

Although, some of the data sets are readable by humans, it can be very complex to be understood and processed using traditional processing techniques. Availability of open source and commercial cloud computing parallel processing platforms has opened new avenues to explore structured, semi-structured or unstructured data. In what follows is provided certain definitions that are related to Big-Data.

There are different ways of defining and comparing Big-Data with the traditional data such as data size, content, collection and processing. Big-Data is defined herein as large data sets that cannot be processed using traditional processing techniques, such as Relational Database Management Systems, in a tolerable processing time. Big-Data is either a relational database (i.e., structured), such as stock market data or non-relational database (semi-structured or unstructured), such as social media data or DNA data sets.

The 4V's of Big-Data are 1) volume of the data, which means the data size. For example, some of companies' data storage is in the order of zeta-bytes; 2) velocity, which means the speed at which the data is generated; 3) variety of the data, which means the data forms that different applications deal with such as sequence data, numeric data or binary data; 4) veracity of the data, which means the uncertainty of the status of the data or how clear the data is to these applications.

Different challenges in Big-Data have been discussed as technical challenges such as the physical storage that stores the Big-Data and reduce the redundancy. Also, there are many challenges such as the process of extracting the information, cleaning data, data integration, data aggregation, and data representation. Since Big-Data has these issues, it needs an environment or framework to work through these challenges. By one embodiment, Hadoop is a framework that works with Big-Data sets to process the huge amounts of data in order to overcome data challenges.

According to an embodiment of the present disclosure, a Map-Reduce job is an access and process-streaming job that splits the input dataset into independent chunks (blocks) and stores them in HDFS. During Map-Reduce, multiple maps are processed in parallel fashion followed by a reduce tasks that are also processed in parallel. Depending upon the specific application, the number of maps can be different than that of reduces.

Storing data in HDFS may have different forms such as <Key, Value> concept to determine the given parameter (Key) and to retrieve the required result (Value) at the end of the job. For example, a "Word Count" job counts number of replication of each word in the data files. FIG. 2 depicts according to an embodiment, an exemplary Map-Reduce example "Word Count" to apply Map-Reduce in unstructured data like books.

The input file 201 includes a sequence of characters that are separated by a space. Accordingly, for the sake of the present example, one can consider the space as a delimiter that separates words. Hadoop divides the data to blocks in the Splitting phase 203. Further, the Mapping phase 205 performs the <key, value> operation for each word (e.g. <Deer, 1>. Further, the shuffling phase 207 collects the values of the same key to be in one intermediate result. Thereafter, the reducing phase 209 provides the addition of values to have one final value for each key. Finally, the Name-Node provides a final result 211 that has all keys and their values as one final result from the MapReduce job.

According to an embodiment, a Hadoop compiler processes MapReduce jobs by dividing the job into multiple tasks, and further distributing the tasks to multiple nodes in the cluster. A MapReduce job cost is obtained by assigning some parameters to the Map-Reduce model. Different parameters required in order to have the job being executed efficiently are: (a) Hadoop Parameters—which is a set of predefined configuration parameters that are in Hadoop setting files; (b) Profile Statistics—which are a set of user-defined properties of input data and functions like Map, Reduce, or Combine; and (c) Profile Cost Factor—which are I/O, CPU, and Network cost job execution parameters.

In what follows is provided a detailed description of the Profile Cost Factor followed by the relationship between the number of blocks and the cost associated with the reading of the data from HDFS. The number of blocks to be read can be expressed as:

$$\text{NumberOfBlocks} = \text{Data-Size}/\text{Block-Size} \qquad (1)$$

where Data-Size is the size of the input data that is to be uploaded to HDFS, and Block-Size is the pre-defined size for data block (e.g., 64 MB). A compression ratio is applied to each block to reduce it in size before it is stored in the HDFS.

MapReduce job reads data from HDFS where the cost of reading a single data block from the HDFS is denoted as 'HdfsReadCost'. The cost of reading the whole data from HDFS is IOCostRead' and can be computed as:

$$\text{IOCostRead} = \text{NumberOfBlocks} \times \text{HdfsReadCost} \qquad (2)$$

Further, the cost of writing a single data block to HDFS is HdfsWriteCost. The cost of writing any data, such as MapReduce job results or raw data, is IOCostWrite and is calculated as follows:

$$\text{IOCostWrite} = \text{NumberOfBlocks} \times \text{HdfsWriteCost} \qquad (3)$$

From the above equations, the total costs of reading and writing from HDFS is based on the number of blocks, which is the data size. Accordingly, by reducing the data size, we can reduce the costs of these processes, which will lead to improving the Hadoop's performance.

Additionally, for every Hadoop's process that the number of blocks is related to its costs. For example, the CPU cost of reading is CPUCostRead and is calculated as follows:

$$\text{CPUCostRead} = \text{NumberOfBlocks} \times \text{InUncompeCPUCost} + \text{InputMapPairs} \times \text{MapCPUCost} \qquad (4)$$

wherein, InUncompeCPUCost is the compression ratio of blocks, InputMapPairs is the number of pairs for mapping process, and MapCPUCost is the cost of mapping one pair.

Figure 3:
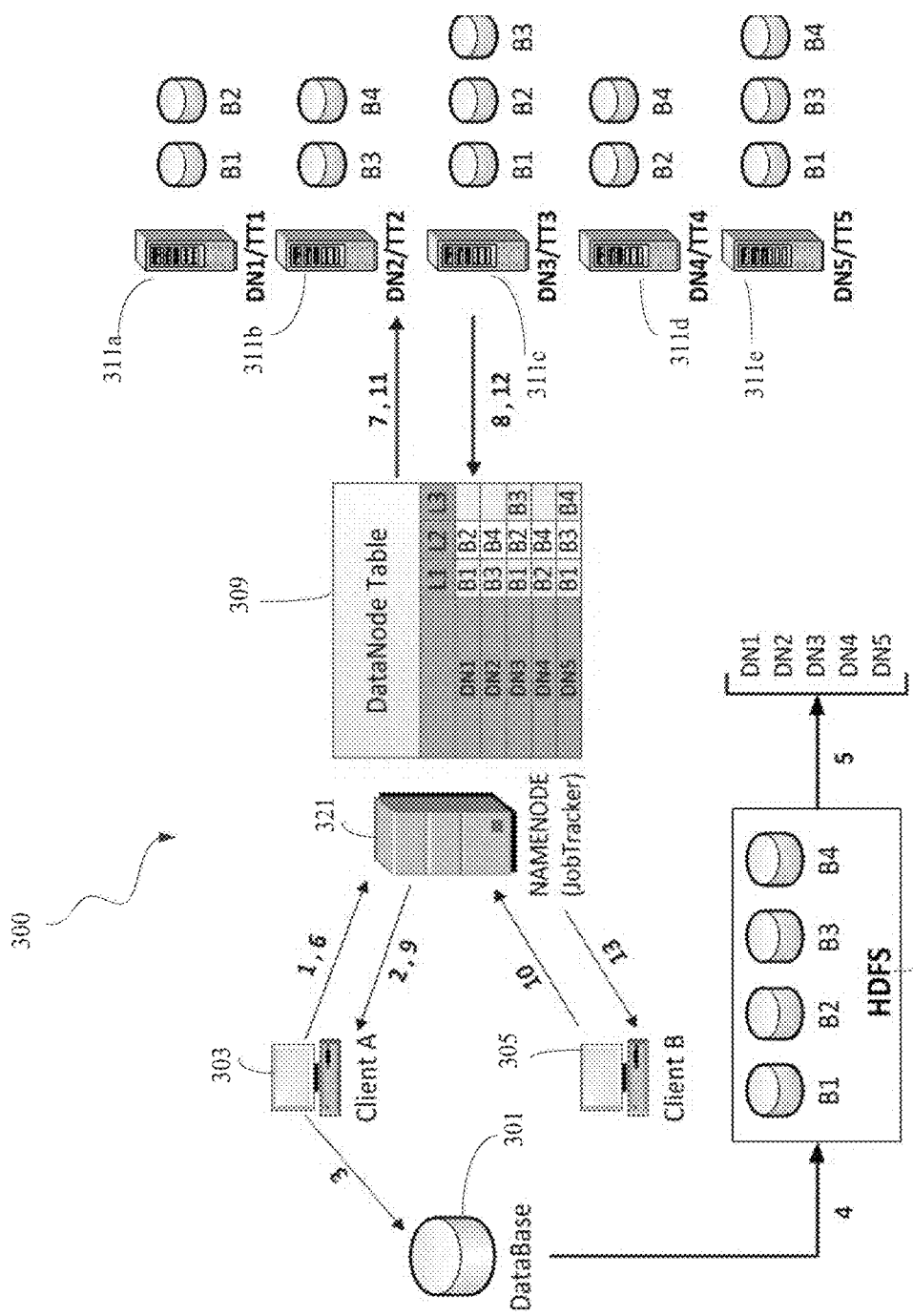
FIG. 3 illustrates an exemplary native Hadoop architecture.

Turning to FIG. 3 is depicted an exemplary Hadoop Map-Reduce workflow 300 according to an embodiment of the present disclosure.

The Hadoop MapReduce architecture as depicted in FIG. 3 includes a database 301, clients 303 and 305, a Name-Node (master node) 321, a data node table 309, HDFS 307, and Data-Nodes 311a-311e. The numbers labeled on the arcs in FIG. 3 depict the step numbers referenced below. In the architecture as depicted in FIG. 3, a client (303/305) first sends a job to the cluster administrator, which is the Name-Node 321. The job can be sent either using Hadoop ecosystem (Query language such as Hive) or by writing a job source code. It must be appreciated that the data source files are uploaded to the HDFS by dividing the Big-Data into blocks that have the same size of data, usually 64 or 128 MB for each block. Further, the blocks are distributed among different Data-Nodes within the cluster. Note that any job is now associated by the name of the data file in HDFS, the source file of MapReduce code (e.g. Java file), and the name of the file where the results will be stored in.

The Hadoop architecture of FIG. 3 (also referred to herein as Native Hadoop architecture) follows the concept of "write-once and read-many". Thus, there is no ability to make any changes in the data source files in HDFS. Each job has the ability to access the data from all blocks. Therefore network bandwidth and latency is not a limitation in the dedicated cloud, where data is written once and read many times. Many iterative computations utilize the architecture efficiently as the computations need to pass over the same data many times.

In the Hadoop MapReduce architecture of FIG. 3, multiple jobs with the same data set work completely independent of each other. In such architecture, searching for the same sequence of characters, for example, in any text format data requires the same amount of time each time we execute the same job. Also, searching for the super-sequence of a sequence that has already been searched requires the same amount of time.

The Map-Reduce workflow of FIG. 3 can be expressed as follows:

Step 1: Client "A" 303 sends a request to Name-Node 321. The request includes the need to copy the data files to Data-Nodes.

Step 2: Name-Node 321 replays with the IP address of Data-Nodes. In the above diagram Name-Node replies with the IP address of five nodes (DN1 to DN5) 311a-311e.

Step 3: Client "A" accesses the raw data for manipulation in Hadoop.

Step 4: Client "A" formats the raw data into HDFS format and divides blocks based on the data size. In the above example the blocks B1 to B4 are distributed among the Data-Nodes.

Step 5: Client "A" 303 sends the three copies of each data block to different Data-Nodes.

Step 6: In this step, client "A" sends a MapReduce job (job1) to the Job-Tracker 321 daemon with the source data file name(s).

Step 7: Job-Tracker sends the tasks to all Task-Trackers holding the blocks of the data.

Step 8: Each Task-Tracker executes a specific task on each block and sends the results back to the Job-Tracker.

Step 9: Job-Tracker sends the final result to Client "A". If client "A" has another job that requires the same datasets it repeats the set 6-8.

Step 10: In native Hadoop client "B" 305 with a new MapReduce job (job2) will go through step 1-5 even if the datasets are already available in HDFS. However, if client "B" knows that the data exists in HDFS, it will send job2 directly to Job-Tracker.

Step 11: Job-Tracker sends job2 to all Task-Trackers.

Step 12: Task-Trackers execute the tasks and send the results back to the Job-Tracker.

Step 13: Job-Tracker sends the final result to Client "B".

Figure 4:
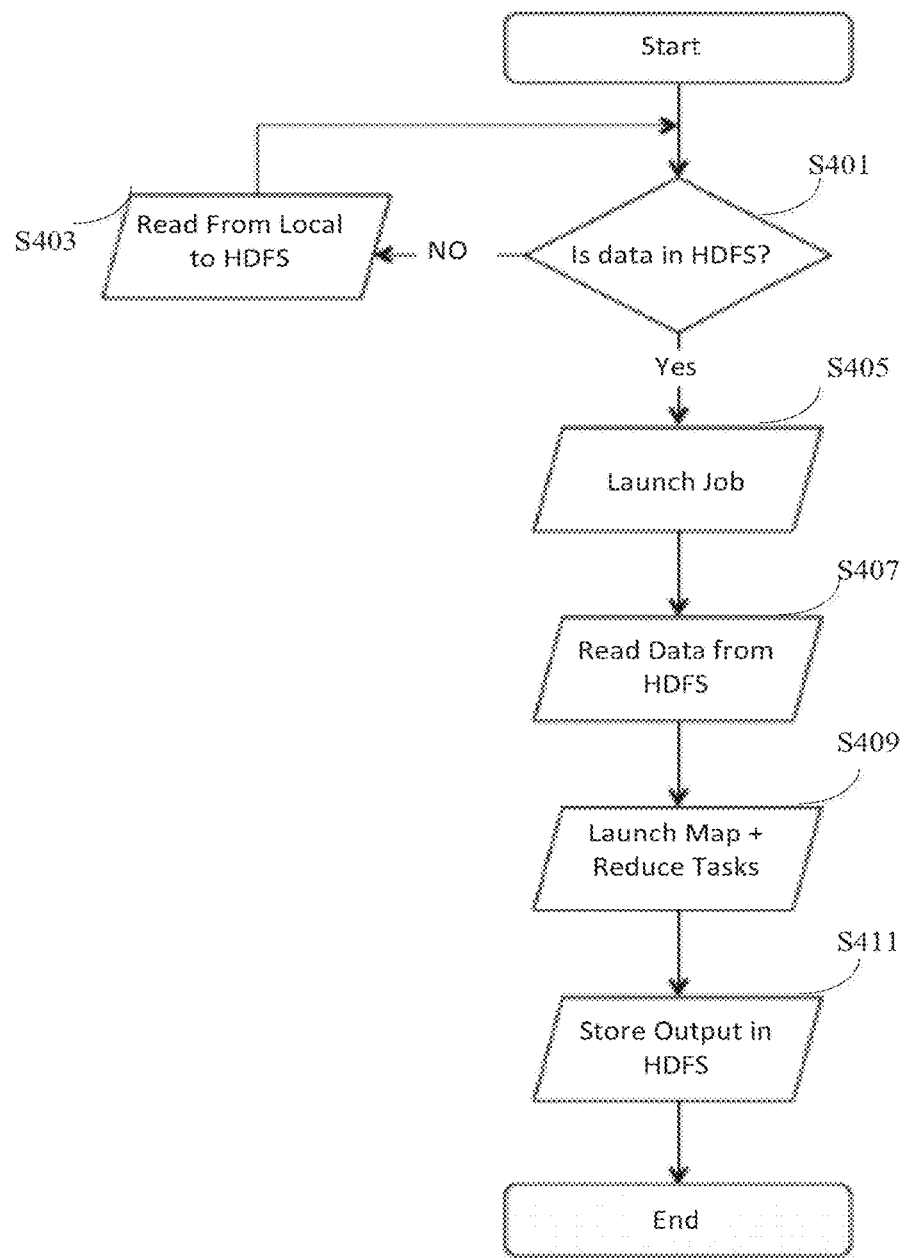
FIG. 4 depicts a flowchart illustrating the steps performed in a Map-Reduce workflow of the native Hadoop architecture.

Turning to FIG. 4 is depicted a flowchart illustrating the steps of a workflow for Native Hadoop architecture according to one embodiment of the present disclosure.

The process commences in step S401 wherein, a query is made to determine whether data is available in the HDFS. If the response to the query is negative, the process proceeds to step S403. If the response to the query is affirmative, the process proceeds to step S405.

In step S403, attempt is made to read data from HDFS whereafter the process loops back to step S401.

In step S405, a job is launched whereafter the corresponding data is read from HDFS in step S407.

The process then proceeds to step S409 whereafter a Map-Reduce task (as explained before) is executed. The process upon completion of the MapReduce task stored the results in the HDFS in step S411 whereafter the process in FIG. 4 terminates.

It can be observed from the flow diagram in FIG. 4 that there is independency between jobs because there are no conditions that test the relationship between the jobs. Thus, every job deals with the same data every time it gets processed. In addition, if we have the same job executed more than one time; it reads all the data every time, which can cause weakness in Hadoop performance.

Many Hadoop MapReduce jobs, especially tasks associated with the science data such as genomic data, deal with the sequences similarities, super-sequences and sub-sequences in DNA. Such tasks usually require multiple MapReduce Jobs to access the same data many times. For a DNA sequence-matching task, if an n-nucleotide long sequence exists in a specific Data-Node, then any super-string-sequence can only be found in the same Data-Nodes.

For example, as shown in FIG. 4, let's suppose that Client A and Client B are searching for the same sequence in Big-Data source files. Once client A finds the sequence, client B will also go through the same steps again to find the same results. Since each job is independent, clients do not share results. Accordingly, process redundancy remains a major unsolved problem in native Hadoop MapReduce infrastructure.

Searching for sequences or mutation of sequences in a large unstructured dataset can be both time-consuming and expensive. Sequence alignment algorithms are often used to align multiple sequences. Due to memory limitation, aligning more than three to four sequences is often not allowed by traditional alignment tools.

In contrast, a Hadoop cluster with three nodes is able to search the sequence data much faster than single node. It is expected that search time will reduce as the number of Data-Nodes are increased in the cluster. However, when we execute a MapReduce job in the same cluster for more than one time, each time it takes the same amount of time. Accordingly, a solution is required that would improve the time involved in the execution of MapReduce jobs. Since current Hadoop Framework does not support storing metadata of previous jobs, it ignores the location of Data-Node with sub-sequence and reads data from all Data-Nodes for every new job.

Specifically, referring to FIG. 3, assume Client A and Client B are searching for similar sequences in Big-Data. Once Client A finds the sequence, Client B will repeat the search of Big-Data again to find the same results. Since each job is independent, clients do not share results. Any client looking for a super sequence with a sequence that has already been searched will have to go through the Big-Data search again. Thus the cost to perform the same job will remain the same each time.

According to one embodiment o the present disclosure, in Hadoop architecture, Name-Node knows the location of the data blocks in HDFS. Name-Node is responsible for assigning the jobs to a client and dividing that job into tasks. Name-Node further assigns the tasks to the Task-Trackers (Data-Nodes). Knowing which Data-Node holds the blocks containing the required data, Name-Node should be able to direct the jobs to the specific Data-Nodes without going through the whole cluster.

According to one embodiment of the present disclosure is provided an enhanced Hadoop architecture (referred to herein as H2Hadoop architecture), wherein before assigning tasks to the Data-Nodes, a pre-processing phase is implemented in the NameNode. The focus in the H2Hadoop architecture is on identifying and extracting features to build a metadata table that carries information related to the location of the data blocks with these features. Any job with the same features should only read the data from these specific blocks of the cluster without going through the whole data again. In what follows is provided a detailed description of the H2Hadoop architecture.

The proposed Hadoop MapReduce workflow (H2Hadoop) is an enhanced version of the Hadoop architecture of FIG. 3 in terms of hardware and/or software, network, and nodes. Specifically, in H2Hadoop the Name-Node generates and saves a lookup table that allows it to save specific data in the look up table which is referred to herein as Common Job Blocks Table CJBT.

The proposed solution can be used for instance with text data. Big-Data, such as Genomic data and books can be processed efficiently using the proposed framework. CJBT stores information about the jobs and the blocks associated with specific data and features. This enables the related jobs to get the results from specific blocks without checking the entire cluster. Each CJBT is related to only one HDFS data file, which means that there is only one table for each data source file(s) in HDFS.

In the present disclosure, we consider the example of genome Big-Data to show the functionality of enhanced Hadoop architecture.

In order to understand the framework of Mapping and Reducing in the proposed platform, we consider search operation of a DNA sequence using H2Hadoop in HDFS. Sequence aligning is an essential step for many molecular biology and bioinformatics applications, such as phylogenetic tree construction, gene finding, gene function, and protein structure prediction.

In contrast to the computationally intensive algorithms that are used for sequence alignment, and scalable parallel processing techniques, the proposed Hadoop architecture relies on CJBT for efficient data analysis. Each time a sequence is aligned using dynamic programming and conventional alignment algorithms, a common feature that is a sequence or sub-sequence is identified and updated in CJBT. Common features in CJBT can be compared and updated each time clients submit a new job to Hadoop. Consequently, the size of this table should be controlled and limited to a specific size to keep the architecture reliable and efficient. A typical CJBT consists of three main components or columns (TABLE I), which are explained below:

TABLE I

COMMON JOB BLOCKS TABLE COMPONENTS

| Common Job name | Common Feature | Block Name | | |
|---|---|---|---|---|
| Sequence_Alignment | GGGATTTA (SEQ ID NO: 6) | B1 | B2 | B3 |
| | TTTAGA (SEQ ID NO: 7) | B1 | B4 | |
| Fining_Sequence | TTTAGCC (SEQ ID NO: 8) | B3 | B6 | |
| | GCCATTAA (SEQ ID NO: 9) | B1 | B3 | B4 |
| | AATCCAGG (SEQ ID NO: 10) | B3 | B5 | |

Referring to TABLE I, Common Job Name represents a shared name of a job that each MapReduce client must use when submitting a new job in order to get the benefit of the proposed architecture. By one embodiment, a library is defined which contains a list of pre-coded jobs that is made available to the user by an Application Program Interface (API). The Jobs APIs provide a brief job description and access to job data. The users select a job name (or shared database name) from the list of jobs already identified for a shared MapReduce job (or data). This feature helps Name-Node to identify and match a job to a Data-Node(s) containing block(s) in the CJBT.

Common Features are defined as the shared data between jobs. H2Hadoop supports caching, enables output (or part of output) to be written in the CJBT during the reduce step. We use Common Features to identify the Data-Nodes or the blocks with shared data entries. Job-Tracker directs any new jobs with the shared common features to block names in CJBT. Suppose J1 and J2 are sequence search jobs, J1 uses Map-Reduce to find the sequence in a Data-Node or a block. If J2 contains common feature of J1 it is logical to map the task and allocate the same data resources of J1.

When a sub-sequence arrives to the Name-Node as the result of a new job, the old common feature will be replaced with the old one. However, feature selection should be done carefully as the response time for the jobs can increase if common features exist in every Data-Node. For example, in genomic data, regulatory sequences and protein binding sites are highly recurring sequences. Using such sequences as common features can degrade the performance of the proposed solution.

The length of common feature also plays on important role in the proposed solution. If the sequence is too short it will be present many times in all chromosomes and all datasets. For a random sequence $D_n$ is the likelihood of how many times a DNA sequence occurs in the whole human genome. The likelihood of the binding sites for 9, 12 and 15 fingers, ZNF is presented in (TABLE II). For a random sequence of length $D_n$, where n is the length of nucleotide sequence, the likelihood of how many times a sequence occurs in the whole human genome is given by:

$$D_n = 3 \times 10^9 / (4)^n$$

where n is the number of nucleotides in a random sequence.

TABLE II

LIKELIHOOD OF RANDOM NUCLEOTIDES

| # of Nucleotides | likelihood of finding any random 9-15 nucleotides sequence in the human genome: $D_{(n)}$ |
|---|---|
| genome | $3 \times 10^9$ |
| 09-nucleotides | $D_9 = 11444$ |
| 12-nucleotides | $D_{12} = 178$ |
| 15-nucleotides | $D_{15} = 2.7$ |

As shown in (TABLE II), the likelihood of any random 9 base pair (bp) of a long nucleotides sequence in a whole genome is quite large comparing with 12 base pair (bp), and using a 9 bp long sequence as a common feature will result in the performance degradation of the proposed architecture. The probability of any random 12 bp long sequence in a human genome is 5.96×10-8 equaling 178 times.

Referring to TABLE I, Block-Name or Block-ID is the location of the common features. It identifies the block(s) in a cluster where certain information is stored. Block-Name helps the Name-Node direct jobs to specific Data-Nodes that store these blocks in HDFS. CJBT has the list of all blocks that are related to the results of the common feature. For example, if a sequence "TTTAGATCTAAAT" (SEQ ID NO: 11) is only stored in B1 and B4, the Name-Node will direct any job that has a particular sequence to B1 and B4. This CJBT is a dynamically configurable table and the Block-Name entries are changing as the common feature changes.

It must be appreciated that CJBT should not become too large because larger lookup table tends to decrease the system performance. The size of CJBT can be limited by employing the 'leaky bucket' algorithm. The 'leaky bucket' parameters can be adjusted to keep the size of CJBT constant. By one embodiment, a user interface gives the user a list of Common Job Names (CJN) to choose from. As the tasks are completed, CJBT is dynamically updated and more relationships are defined. If the CJBT is empty, the user will execute the MapReduce job in a traditional way without getting the benefits of the proposed solution. The predefined CJN and CF are defined either by the user or by the user interface manager, which might become a central source for updating the lists for all clients.

By one embodiment, each feature maintained in the CJBT has an associated reuse factor. Specifically, the length of time a feature is maintained in the CJBT is based on the reuse factor, wherein if a common feature is used/repeated in several subsequent jobs, the corresponding feature is maintained in the CJBT for an elongated period of time as opposed the case wherein if the feature is less frequently used, its lifespan in the CJBT table is reduced.

By one embodiment, if a feature is repeated in a subsequent job, the length of time it is maintained in the table may be controlled by a refresh (reuse) parameter that extends the lifespan of the feature. For instance, the lifespan of the feature may be increased exponentially based on the number of times the particular feature is used. Correspondingly, if a feature is not used by subsequent tasks, the lifespan of the feature may decay (for instance in an exponential manner) until it is eventually removed from the CJBT.

Figure 5:
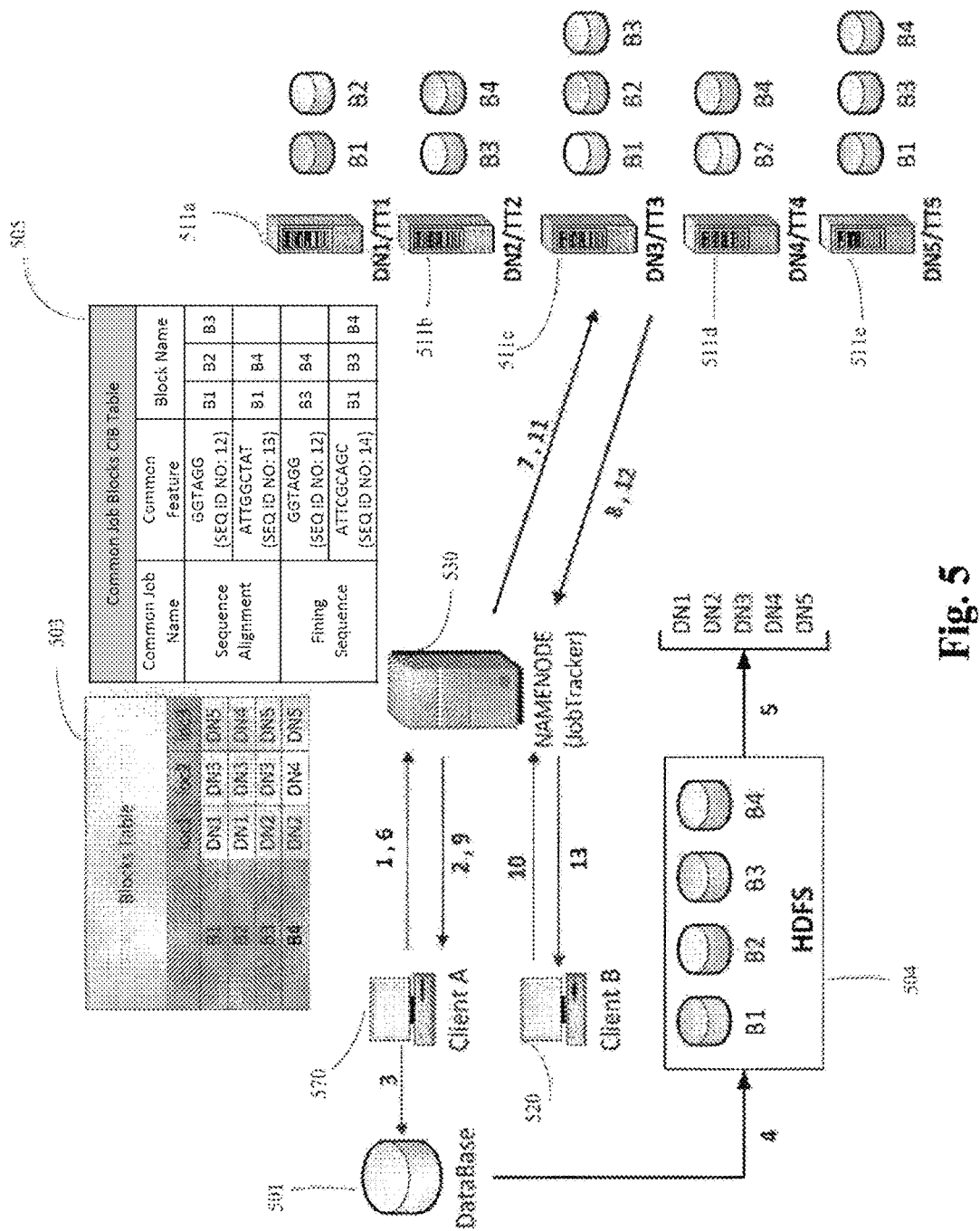
FIG. 5 illustrates an exemplary enhanced Hadoop architecture (H2Hadoop)

Turning to FIG. 5 is illustrated an exemplary enhanced Hadoop (H2Hadoop) MapReduce workflow architecture 500. By one embodiment, the H2Hadoop architecture 500 as depicted in FIG. 5 enhances the performance of the Hadoop architecture of FIG. 3 as described below. The numbers labeled on the arcs in FIG. 5 depict the step numbers referenced below.

MapReduce workflow in H2Hadoop as follows:

Step 1 to Step 8: remain in the same workflow as native Hadoop (FIG. 3). However, there is one exception that results from the first 7 steps are stored in the CJBT.

Step 9: Job-Tracker (node 530) sends the result to Client "A" 510. In this step, Name-Node 530 maintains (i.e., stores) the names of the blocks that produced the results, in the local lookup table (CJBT) by the Common Job Name (Job1) that has common feature as explained above.

Step 10: Client "B" 520 sends a new Map-Reduce job "Job2" to the Job-Tracker 530 with the same common job name and same common feature or super-sequence of "Job1".

Step 11: Job-Tracker 530 sends "job2" to Task-Trackers (511*a*-511*e*) that hold the blocks (B1, B2 etc.), which have the first result of the MapReduce "Job1" (DN2, DN4, DN5). In this step, the Job-Tracker 530 commences by checking the CJBT first to find if it is a new job, which has the same common name and common features of any previous jobs or not—In this case yes. Then the Job-Tracker sends "Job2" only to TT2, TT4 and TT5. We may assume here that the lookup table will be updated with more details OR just remain as is because every time we have a new job that may carry the same name of "Job1".

Step 12: Task-Trackers execute the tasks and send the results back to the Job-Tracker 530.

Step 13: Job-Tracker 530 sends the final result to Client "B" 520.

The workflow that is described above explains the normal flow steps of the H2Hadoop MapReduce framework. By one embodiment, there may be a training phase included in the workflow, which commences before starting the process of MapReduce, in order to have some metadata in the CJBT to receive the benefits of the new architecture.

From the flowchart that is explained next with reference to FIG. 6, one can observe that there are two more conditions in H2Hadoop as compared with native Hadoop that perform with a delay in job processing. However, if there is a relationship between jobs, H2Hadoop performance will be better than the native Hadoop. The above-mentioned delay in H2Hadoop ultimately causes a short delay in time.

Figure 6:
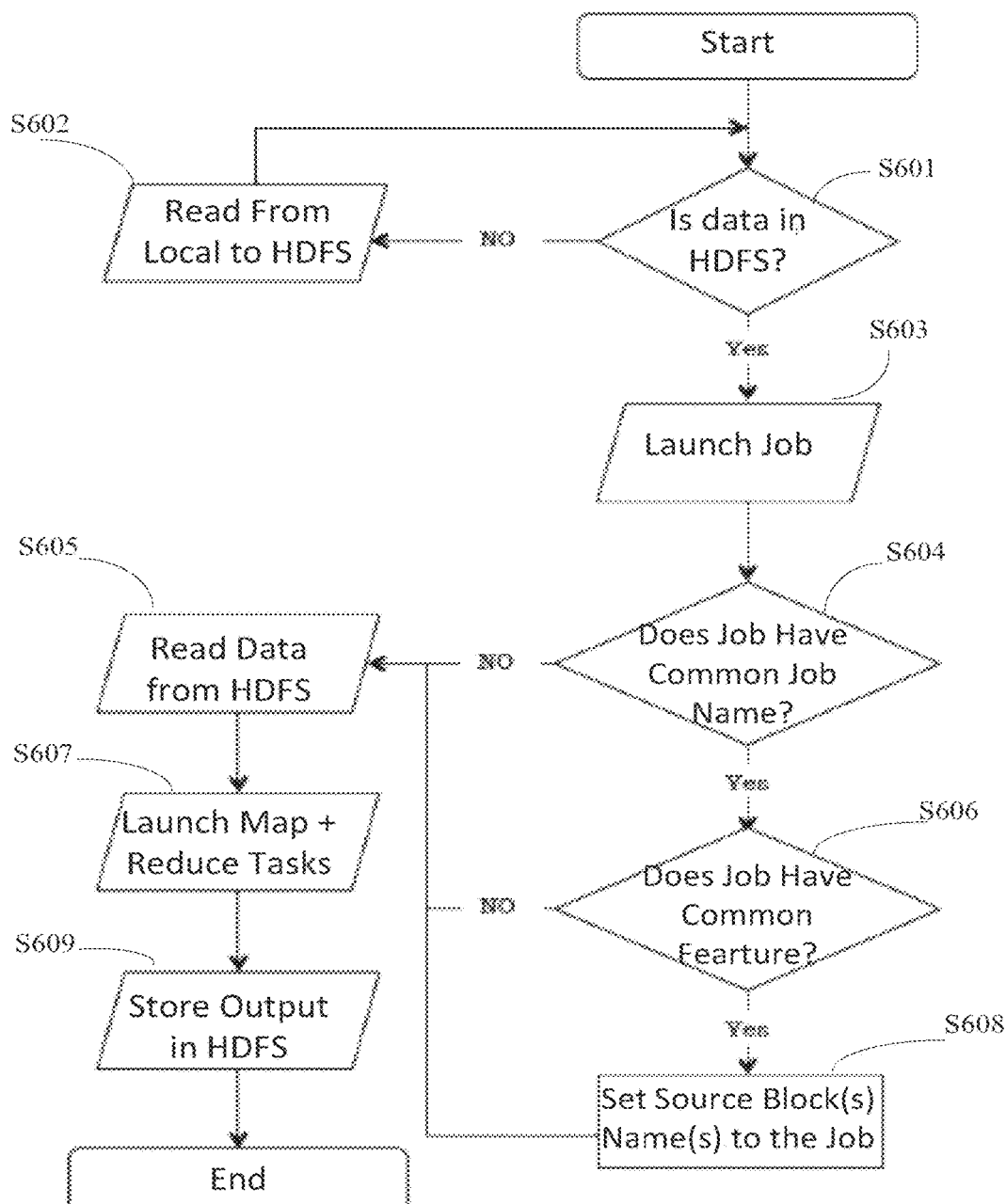
FIG. 6 depicts a flowchart illustrating the steps performed in a Map-Reduce workflow of the enhanced Hadoop architecture.

Turning to FIG. 6 is depicted a flowchart illustrating the steps of a workflow for enhanced Hadoop architecture according to one embodiment of the present disclosure.

The process commences in step S601 wherein, a query is made to determine whether data is available in the HDFS. If the response to the query is negative, the process proceeds to step S602. If the response to the query is affirmative, the process proceeds to step S603, wherein the particular job is launched.

The process further proceeds to step S604, wherein a query is made to determine whether the particular job has a common job name that is stored in the CJBT. If the response to the query in step S604 is affirmative, the process proceeds to step S606. However, if the response to the query in step S604 is negative, the process proceeds to step S605.

In step S606, another query is made to determine whether the job has common features. If the response to the query is affirmative, the process moves to step S608. However, if the response to the query is negative, the process moves to step S605.

In step S608, the source blocks are assigned to the particular job.

In step S605, data corresponding to the job is read from the HDFS. Further, the process moves to step S607 wherein, the Map-Reduce task is launched for the job. Upon completion of the Map-Reduce process for the particular job, the process moves to step S609 wherein the output is stored in the HDFS, whereafter the process of FIG. 6 terminates.

By one embodiment, in the H2Hadoop framework as described in FIGS. 5 and 6, after launching a job there is a condition which tests the name of the job. If the job uses a CJN, which means this job is commonly used, there might be a relationship between this job and other job. Otherwise, if the name of the job is not common, the process as depicted in FIG. 6 skips the second condition (S606) and reads the whole data from the HDFS and completes the execution.

It must be appreciated that if the name of the job is common, which means the first condition is "Yes", the process performs a secondary check to test the common feature of the job. If the feature of the new job is common with any previous job, the new job reads the specific data blocks (as opposed to reading the entire data block) from the HDFS and sets them as source data files.

Under these two conditions as depicted in S604 and S606, the H2Hadoop framework reduces the size of the data that is being read by the new job. Consequently, the H2Hadoop framework incurs the advantageous ability of improving the performance for jobs that are working on similar data files.

In what follows is provided a description, according to an embodiment, of an implementation framework for the H2Hadoop architecture. The performance of the H2Hadoop architecture was evaluated under specific circumstances, which include number of data files and the size of each file. By an embodiment, the framework was implemented for two different scenarios: a first scenario, wherein there are a plurality of source data files and each file has a size that is less than the default value of the block size, and a second scenario wherein, there are one or more data source files and most of the files have sizes that are larger than the default block size.

By one embodiment, DNA chromosome data was utilized to test the performance of H2Hadoop architecture, and the data source size is approximately 24 files. Each file is less than the default block size in Hadoop. Various jobs were implemented using the above described data, wherein the implementation of the embodiments described herein can be categorized into the following three phases.

The first phase is related to the creation of the common job block table (CJBT). By one embodiment, a NoSQL database such as HBase is used to create the CJBT. HBase is a column-oriented database which is expanded horizontally.

HBase is a preferred technique for implementing the CJBT as it is Apache open source software that is one of NoSQL databases that works on top of Hadoop. HBase is utilized as an indexing table to enable the H2Hadoop framework. However, it must be appreciated that other techniques such as a key-value data structure such as dictionary in Python may also be used to create the CJBT.

The second phase pertains to the design of a user interface (UI). By one embodiment, the user interface should be a user-friendly interface so that the user can receive the benefits of the enhanced design when choosing common data from lists. For example, when choosing the CJN from a list of common job names that are related to the similar data files.

Different forms of user interfaces may be designed based on the user's needs. According to an embodiment of the present disclosure, a command line UI is implemented. The command line UI is beneficial for cases when the user knows the commands and the related parameters that are to be used. Hadoop and HBase are controlled by the same command line, which is a shell command line in Linux. Accordingly, the shell command line is implemented as a user interface to implement the features of the embodiments described herein.

According to one embodiment of the present disclosure, the Hadoop cluster includes one Master node, which is the Name-Node and performs the Job-Tracker process. The cluster includes 9 slave nodes that work as Data-Nodes and perform the Task-Tracker process in different locations. Linux Open-SUSE is utilized as an operating system on all nodes in the cluster. Note that both versions of the OS i.e., OpenSUSE11.1 and OpenSUSE12.3 may be used. Apache Hadoop1.2.1, which is the stable version of Hadoop, is used and Apache HBase 0.98, which is the stable version of HBase, is implemented on the cluster.

By one embodiment, the scenario of having common features to exist increases the performance of the H2Hadoop system. For instance, in DNA chromosomes, there are a couple of sequences that are common for searching protein process. The following examples are some sequences and their locations as illustrated in TABLE III:

TABLE III

COMMON JOB BLOCK TABLE (DNA EXAMPLE)

| | Common Feature (Sequence) | Block Name/ID (Chromosome Name) |
|---|---|---|
| sq1 | GGGGCGGGG (SEQ ID NO: 1) | In All Chromosomes |
| sq2 | AAGACGGTGGTAAGG (SEQ ID NO: 2) | 1, 8 |
| sq3 | CATTTCTGCTAAGA (SEQ ID NO: 3) | 1, 2, 3, 4, 6, 7, 9, 10, 11, 12, 13, 18, 19, 21 |
| sq4 | GAATGTCCTTTCTCT (SEQ ID NO: 4) | 1, 3, 6, 7, 9, 17, 19, 20, 21 |
| sq5 | GATCTCAGCCAGTGTGAAA (SEQ ID NO: 5) | 3, 7, 16 |

In what follows is provided a comparison of the native Hadoop Map-Reduce environment to the H2Hadoop described herein. By one embodiment of the present disclosure, implementing the H2Hadoop technique, less data size is read by the related jobs. Thus, a reduction in the number of read operations has a direct effect on the performance of Hadoop framework.

The performance of Hadoop Map-Reduce depends upon the length of common features and the likelihood of finding the common features in the source files and Data-Nodes. If the common features exist in all source files, then H2Hadoop will not improve the performance as the job will be read from all files that contain the common feature.

From instance, referring to TABLE III, SEQ ID NO: 11 is located in all chromosomes, which means it is located in all data blocks. So, H2Hadoop will read the whole (all) data files again if the common feature is SEQ ID NO: 11. In this case H2Hadoop gives no benefits over the native Hadoop architecture. However, all other sequences have better performance, as common feature using H2Hadoop rather than Native Hadoop since they are not present in all data files.

Figure 7:
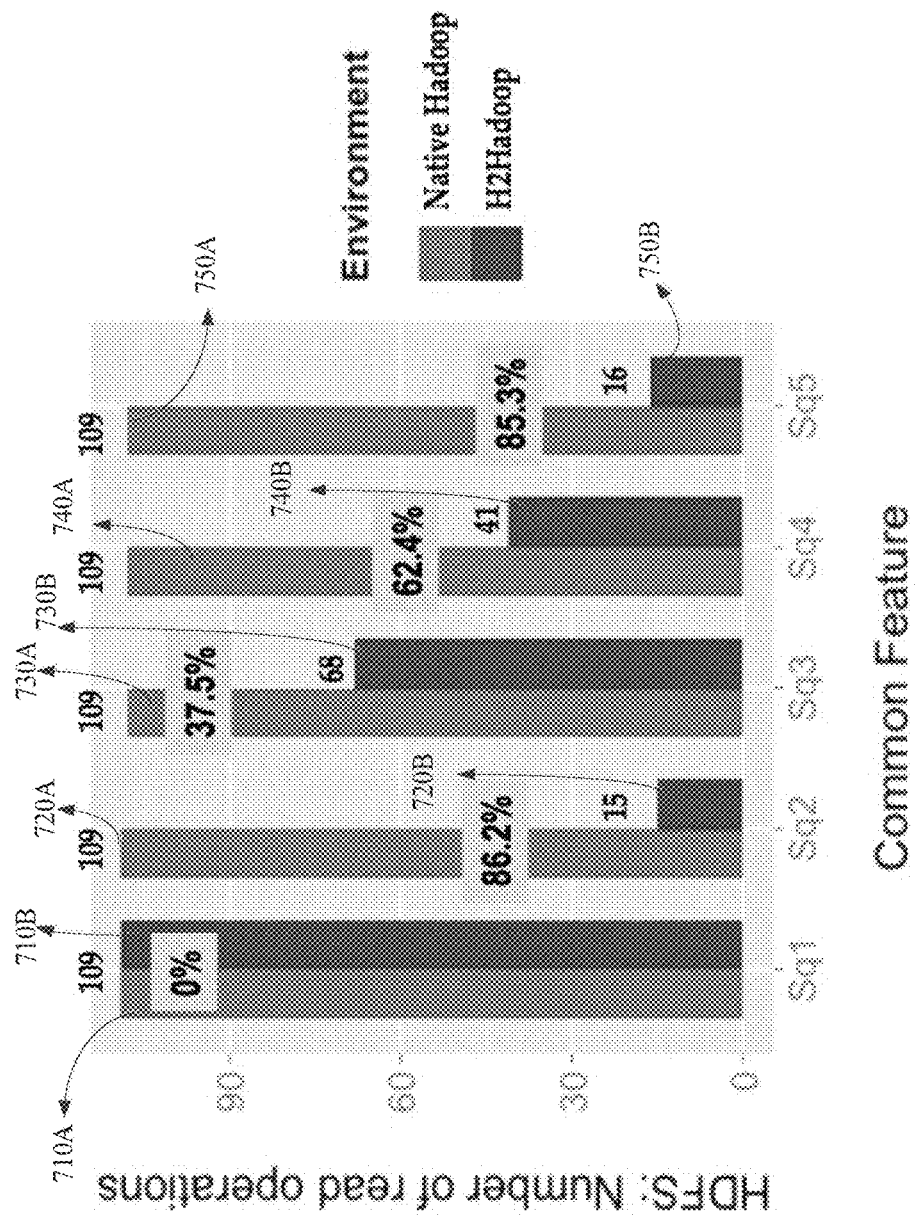
FIG. 7 illustrates according to an embodiment, an exemplary bar-graph depicting a performance comparison of the native Hadoop and the H2Hadoop architectures.

TABLE III provides an exemplary example providing indications of positive results from the implementation in terms of the number of blocks that are read from HDFS. FIG. 7 illustrates one of the results, which is the number of read operations in native Hadoop compared with H2Hadoop.

Number of read operations is one component of Hadoop Map-Reduce and corresponds to the number of times that Map-Reduce reads block from HDFS. Thus, based on the data size one can determine the number of blocks that should be read by the MapReduce job. As stated previously, by reducing the number of read operations we can improve the performance.

FIG. 7 illustrates a bar graph depicting improvement in Hadoop performance by reducing the number of read operations from HDFS. Specifically, FIG. 7 illustrates a bar graph depicting sequences (of TABLE III) on the X-axis and the number of HDFS read operations on the Y-axis. Further, the bars depicted as 710A, 720A, 730A, 740A, and 750A correspond to the performance (i.e., number of read operations) for the native Hadoop architecture, whereas the bars depicted as 710B, 720B, 730B, 740B, and 750B correspond to the performance of the H2Hadoop framework.

In native Hadoop, the number of read operations remains the same in every job because it reads all data files again during each job. While, in H2Hadoop there is difference in number of read operations based on how frequent the sequence exists in the DNA. For instance, as shown in FIG. 7, native Hadoop incurs a total number of read operations of 109, for the sequences depicted in TABLE III. In contrast, by using H2Hadoop, the numbers of read operations are reduced to be 15, 68, 41, and 16 for SEQ ID NO: 2 to SEQ ID NO: 5, respectively. Thus, for SEQ ID NO: 2, the H2Hadoop increases the efficiency by 86.2%. On the other hand, since SEQ ID NO: 1 exists in every chromosome, the number of read operations remains the same 109 in H2Hadoop as native Hadoop.

Additionally, it must be appreciated that the length of the sequence also may affect the performance of the system. Finding short sequences in length take less time than finding longer ones. However, the chance of having a common feature that is very long is minute as we explained in TABLE II.

Figure 8:
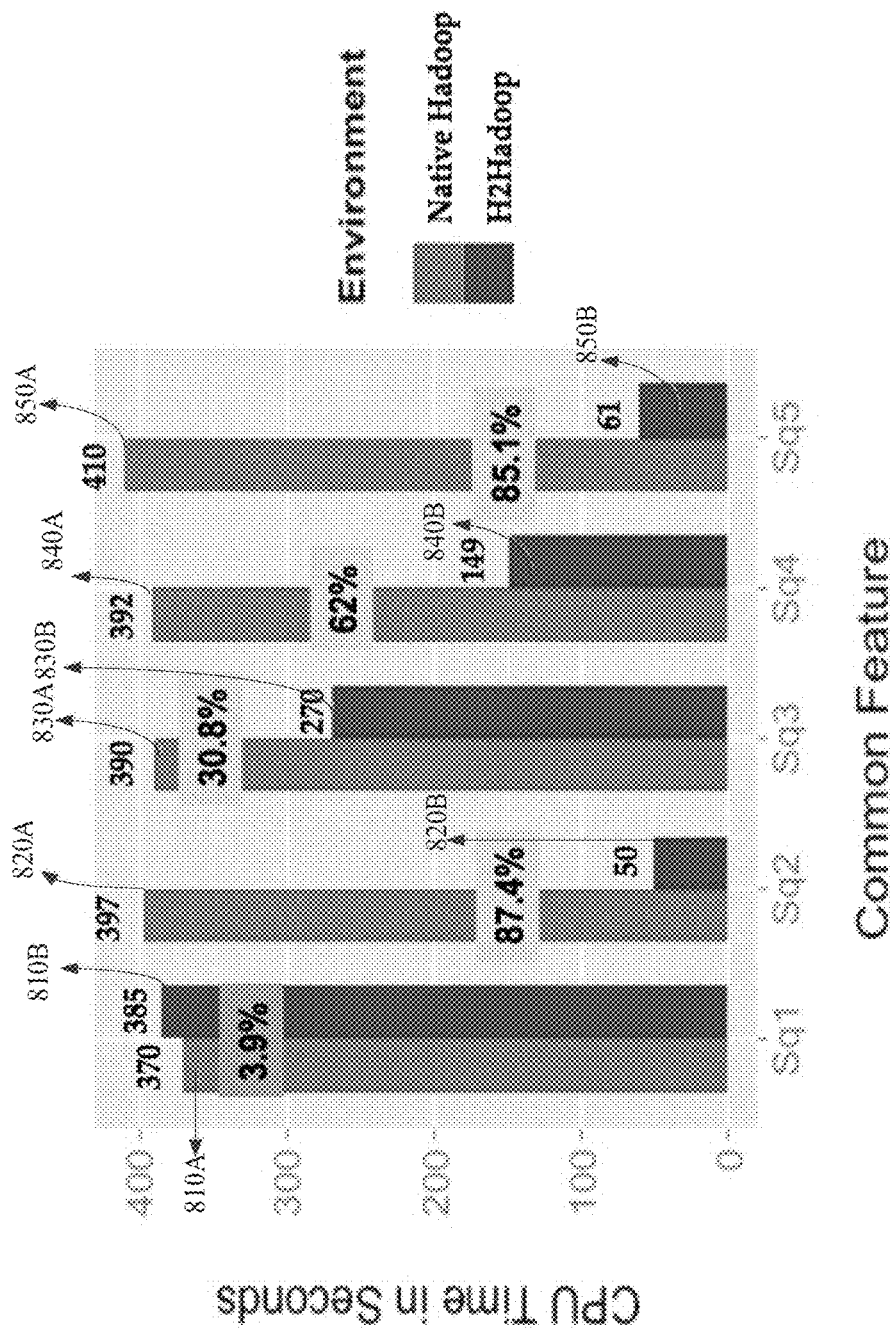
FIG. 8 illustrates according to an embodiment, another exemplary bar-graph depicting a performance comparison of the native Hadoop and the H2Hadoop architectures.

According to one embodiment of the present disclosure, another component of the Hadoop Map-Reduce framework is CPU processing time. FIG. 8 depicts an exemplary bar graph with the sequences (TABLE III) plotted on the X-axis and the CPU processing time plotted on the Y-axis. The bars 810A, 820A, 830A, 840A, and 850A correspond to the performance (i.e., CPU processing time) for the five sequences of TABLE III for the native Hadoop framework, whereas the bars 810B, 820B, 830B, 840B, and 850B correspond to the performance (i.e., CPU processing time) for the five sequences of TABLE III for the H2Hadoop framework.

In H2Hadoop, one can observe a large difference between the CPU processing-time for H2Hadoop, which is less than native Hadoop, since H2Hadoop does not read all data blocks from HDFS. For example, CPU processing-time in native Hadoop to process the job search for SEQ ID NO: 2 is 397 seconds, whereas it is 50 seconds in H2Hadoop. Thus, the H2Hadoop framework reduces the CPU processing time by 87.4% as compared to native Hadoop.

However, for SEQ ID NO: 1, the CPU processing time in native Hadoop is less than H2Hadoop. Since SEQ ID NO: 1 exists in all chromosomes, H2Hadoop reduces the efficiency by 3.9%. So, there is an overhead time in H2Hadoop, which is the process of looking for related jobs in the lookup table (CJBT) in H2Hadoop. It must be appreciated that such a scenario rarely occurs based on the information depicted in Table II. Such an overhead (for SEQ ID NO: 1 only) may exist in all jobs because it is the processing time of checking the lookup table. However, it costs very tiny amount of time comparing with the benefit that can be gained by using H2Hadoop.

By one embodiment, there are different factors in native Hadoop one can study and then compare with Enhanced Hadoop (H2Hadoop). TABLE IV depicts the processing results when finding the job sequence in SEQ ID NO:2, which is (AAGACGGTGGTAAGG) in DNA data blocks.

TABLE IV list of factors to compare between native Hadoop and H2Hadoop.

| Facility: AAGACGGTGGTAAGG (SEQ ID NO: 2) | NativeHadoop | EnhancedHadoop |
| --- | --- | --- |
| HDFS: Number of bytes read | 2849886343 | 366081652 |
| HDFS: Number of bytes written | 18 | 18 |
| HDFS: Number of read operations | 109 | 15 |
| HDFS: Number of write operations | 1 | 1 |
| Launched map tasks | 54 | 7 |
| Launched reduce tasks | 1 | 1 |
| Data-local map tasks | 54 | 7 |

TABLE IV-continued list of factors to compare between native Hadoop and H2Hadoop.

| Facility: AAGACGGTGGTAAGG (SEQ ID NO: 2) | NativeHadoop | EnhancedHadoop |
| --- | --- | --- |
| Total time spent by all maps in occupied slots (ms) | 1081818 | 125025 |
| Total time spent by all reduces in occupied slots (ms) | 541908 | 51611 |
| Map input records | 40136519 | 5155633 |
| Map output records | 40136519 | 5155633 |
| Map output bytes | 802730380 | 103112660 |
| Input split bytes | 6016 | 1610 |
| Reduce shuffle bytes | 883003742 | 113423968 |
| Reduce input records | 40136519 | 5155633 |
| Reduce output records | 1 | 1 |
| CPU time spent (ms) | 396850 | 50650 |
| Physical memory (bytes) snapshot | 10718003200 | 1559015424 |
| Virtual memory (bytes) snapshot | 21330644992 | 3103256576 |
| Total committed heap usage (bytes) | 8884019200 | 1328115712 |

Finding the location of the data blocks with the common features can result in latency during the reading process. However, the benefits of the proposed system are much more than the disadvantages. Advantages of the proposed system go beyond the number of read operations and the performance of the system. The proposed system further reduces the data transfer within the network and reduces the cost of execution of the MapReduce job as the number of active Data-Nodes during the action of a job reduces.

Each of the functions of the described embodiments may be implemented by one or more processing circuits. A processing circuit includes a programmed processor (for example, processor 903 in FIG. 9), as a processor includes circuitry. A processing circuit also includes devices such as an application-specific integrated circuit (ASIC) and circuit components that are arranged to perform the recited functions.

Figure 9:
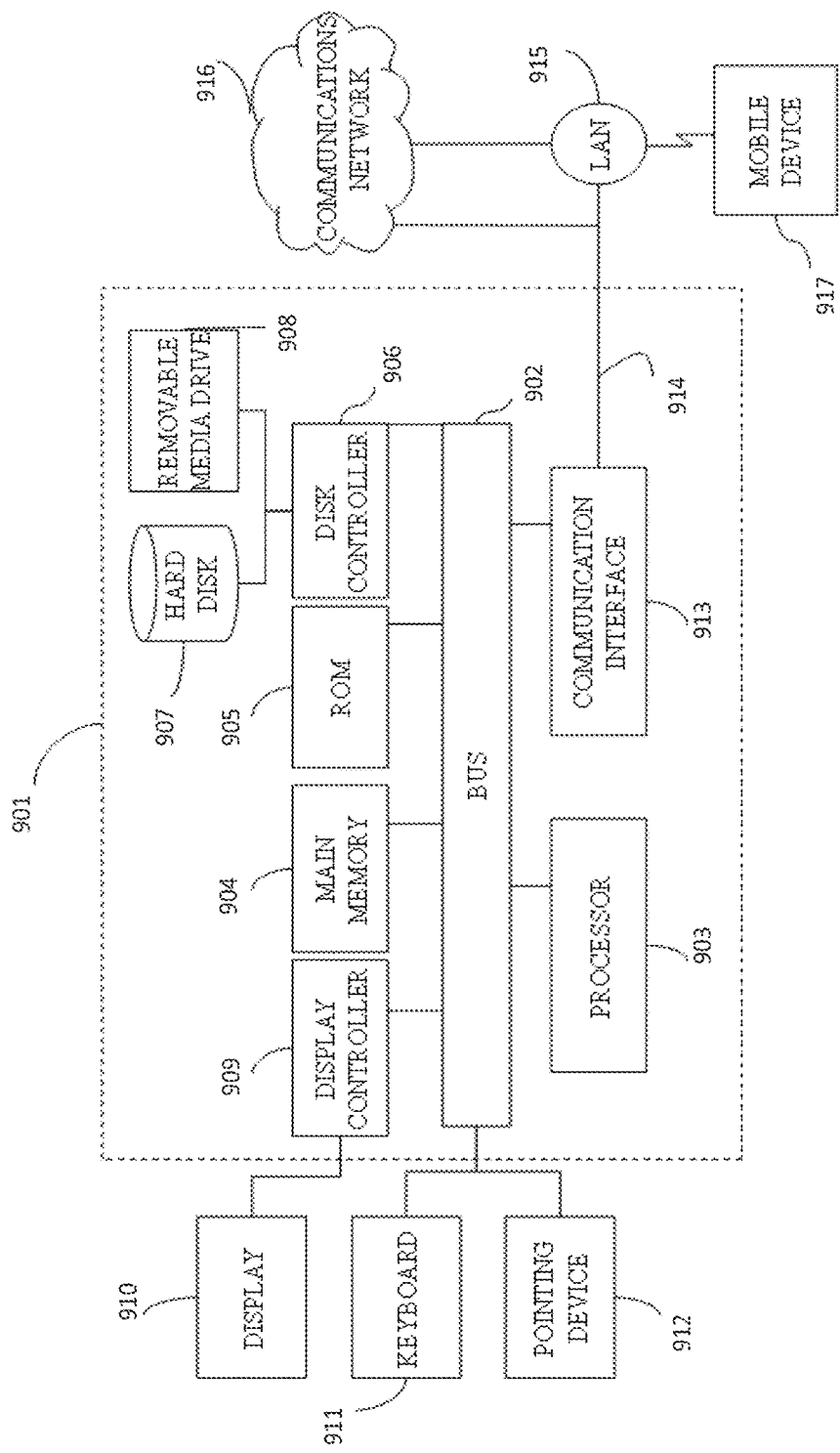
FIG. 9 illustrates a block diagram of a computing device according to one embodiment.

The various features discussed above may be implemented by a computer system (or programmable logic). FIG. 9 illustrates such a computer system 901. In one embodiment, the computer system 901 is a particular, special-purpose machine when the processor 903 is programmed to perform the tasks of the Name-Node (server) such as looking up data sequences in an HDFS.

The computer system 901 includes a disk controller 906 coupled to the bus 902 to control one or more storage devices for storing information and instructions, such as a magnetic hard disk 907, and a removable media drive 908 (e.g., floppy disk drive, read-only compact disc drive, read/write compact disc drive, compact disc jukebox, tape drive, and removable magneto-optical drive). The storage devices may be added to the computer system 901 using an appropriate device interface (e.g., small computer system interface (SCSI), integrated device electronics (IDE), enhanced-IDE (E-IDE), direct memory access (DMA), or ultra-DMA).

The computer system 901 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 901 may also include a display controller 909 coupled to the bus 902 to control a display 910, for displaying information to a computer user. The computer system includes input devices, such as a keyboard 911 and a pointing device 912, for interacting with a computer user and providing information to the processor

903. The pointing device 912, for example, may be a mouse, a trackball, a finger for a touch screen sensor, or a pointing stick for communicating direction information and command selections to the processor 903 and for controlling cursor movement on the display 910.

The processor 903 executes one or more sequences of one or more instructions contained in a memory, such as the main memory 904. Such instructions may be read into the main memory 904 from another computer readable medium, such as a hard disk 907 or a removable media drive 908. One or more processors in a multi-processing arrangement may also be employed to execute the sequences of instructions contained in main memory 904. In alternative embodiments, hard-wired circuitry may be used in place of or in combination with software instructions. Thus, embodiments are not limited to any specific combination of hardware circuitry and software.

As stated above, the computer system 901 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes. Stored on any one or on a combination of computer readable media, the present disclosure includes software for controlling the computer system 901, for driving a device or devices for implementing the features of the present disclosure, and for enabling the computer system 901 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the present disclosure.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 903 for execution. A computer readable medium may take many forms, including but not limited to, non-volatile media or volatile media. Non-volatile media includes, for example, optical, magnetic disks, and magneto-optical disks, such as the hard disk 907 or the removable media drive 908. Volatile media includes dynamic memory, such as the main memory 904. Transmission media, on the contrary, includes coaxial cables, copper wire and fiber optics, including the wires that make up the bus 902. Transmission media also may also take the form of acoustic or light waves, such as those generated during radio wave and infrared data communications.

Various forms of computer readable media may be involved in carrying out one or more sequences of one or more instructions to processor 903 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 901 may receive the data on the telephone line and place the data on the bus 902. The bus 902 carries the data to the main memory 904, from which the processor 903 retrieves and executes the instructions. The instructions received by the main memory 904 may optionally be stored on storage device 907 or 908 either before or after execution by processor 903.

The computer system 901 also includes a communication interface 913 coupled to the bus 902. The communication interface 913 provides a two-way data communication coupling to a network link 914 that is connected to, for example, a local area network (LAN) 915, or to another communications network 916 such as the Internet. For example, the communication interface 913 may be a network interface card to attach to any packet switched LAN. As another example, the communication interface 913 may be an integrated services digital network (ISDN) card. Wireless links may also be implemented. In any such implementation, the communication interface 913 sends and receives electrical, electromagnetic or optical signals that carry digital data streams representing various types of information.

The network link 914 typically provides data communication through one or more networks to other data devices. For example, the network link 914 may provide a connection to another computer through a local network 915 (e.g., a LAN) or through equipment operated by a service provider, which provides communication services through a communications network 916. The local network 914 and the communications network 916 use, for example, electrical, electromagnetic, or optical signals that carry digital data streams, and the associated physical layer (e.g., CAT 5 cable, coaxial cable, optical fiber, etc.). The signals through the various networks and the signals on the network link 914 and through the communication interface 913, which carry the digital data to and from the computer system 901 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 901 can transmit and receive data, including program code, through the network(s) 915 and 916, the network link 914 and the communication interface 913. Moreover, the network link 914 may provide a connection through a LAN 915 to a mobile device 917 such as a personal digital assistant (PDA) laptop computer, or cellular telephone.

While aspects of the present disclosure have been described in conjunction with the specific embodiments thereof that are proposed as examples, alternatives, modifications, and variations to the examples may be made. It should be noted that, as used in the specification and the appended claims, the singular forms "a," "an," and "the" include plural referents unless the context clearly dictates otherwise.

The invention claimed is:

1. A server comprising:
   circuitry configured to
   receive source data that is to be uploaded to a plurality of processing nodes,
   partition the received source data into a plurality of data-blocks, each data block having a fixed size, and being replicated a predetermined number of times,
   upload the partitioned and replicated data-blocks to the processing nodes, each replicated data block being stored in a unique processing node,
   maintain a first data structure corresponding to a plurality of previously submitted jobs to the server, the first data structure including at least one a job identifier, at least one sequence of text associated with the at least one job identifier, and a list of processing nodes associated with the at least one sequence of text, each sequence of text stored in the first data structure having a length that is based on a likelihood of occurrence of the sequence of text,
   receive a subsequent job including a job name from a client node;
   determine whether the job name matches the job identifier stored in the first data structure,
   allocate based on the determination, only the list of processing nodes corresponding to the matched identifier to the subsequent job, and
   update the first data structure by computing for each sequence of text a lifespan parameter, the lifespan parameter for each sequence of text being computed based on a reuse factor of the sequence of text.

2. The server of claim 1, wherein the received source data is one of a text data of a book, and text data corresponding to genome data.

3. The server of claim 1, wherein each data-block is replicated three times, and the size of each data-block is one of 64 mega-bytes and 128 mega-bytes.

4. The server of claim 1, wherein the sequence of text is a DNA sequence.

5. The server of claim 1, wherein a size of the first data structure is fixed and the circuitry is further configured to maintain the fixed size of the first data structure by implementing a leaky-bucket algorithm.

6. The server of claim 1, wherein the reuse factor of the sequence of text corresponds to a number of times the sequence is used in a predetermined number of jobs.

7. The server of claim 6, wherein the lifespan parameter of the sequence of text is either increased or decreased in an exponential fashion.

8. A method performed by a server including circuitry, the method comprising:
   receiving source data that is to be uploaded to a plurality of processing nodes;
   partitioning by circuitry, the received source data into a plurality of data-blocks, each data block having a fixed size, and being replicated a predetermined number of times;
   uploading the partitioned and replicated data-blocks to the processing nodes, each replicated data block being stored in a unique processing node;
   maintaining a first data structure corresponding to a plurality of previously submitted jobs to the server, the first data structure including at least one a job identifier, at least one sequence of text associated with the at least one job identifier, and a list of processing nodes associated with the at least one sequence of text, each sequence of text stored in the first data structure having a length that is based on a likelihood of occurrence of the sequence of text;
   receiving a subsequent job including a job name from a client node;
   determining whether the job name matches the job identifier stored in the first data structure;
   allocating based on the determination, only the list of processing nodes corresponding to the matched identifier to the subsequent job; and
   updating by circuitry, the first data structure by computing for each sequence of text a lifespan parameter, the lifespan parameter for each sequence of text being computed based on a reuse factor of the sequence of text.

9. The method of claim 8, wherein the received source data is one of a text data of a book, and text data corresponding to genome data.

10. The method of claim 8, wherein each data-block is replicated three times, and the size of each data-block is one of 64 mega-bytes and 128 mega-bytes.

11. The method of claim 8, wherein the sequence of text is a DNA sequence.

12. The method of claim 8, wherein a size of the first data structure is fixed and the circuitry is further configured to maintain the fixed size of the first data structure by implementing a leaky-bucket algorithm.

13. The method of claim 8, wherein the reuse factor of the sequence of text corresponds to a number of times the sequence is used in a predetermined number of jobs.

14. The method of claim 13, wherein the lifespan parameter of the sequence of text is either increased or decreased in an exponential fashion.

15. A non-transitory computer readable medium including computer executable instructions, wherein the instructions, when executed by a computer, cause the computer to perform a method comprising:
   receiving source data that is to be uploaded to a plurality of processing nodes;

partitioning the received source data into a plurality of data-blocks, each data block having a fixed size, and being replicated a predetermined number of times;

uploading the partitioned and replicated data-blocks to the processing nodes, each replicated data block being stored in a unique processing node;

maintaining a first data structure corresponding to a plurality of previously submitted jobs to the server, the first data structure including at least one a job identifier, at least one sequence of text associated with the at least one job identifier, and a list of processing nodes associated with the at least one sequence of text, each sequence of text stored in the first data structure having a length that is based on a likelihood of occurrence of the sequence of text;

receiving a subsequent job including a job name from a client node;

determining whether the job name matches the job identifier stored in the first data structure;

allocating based on the determination, only the list of processing nodes corresponding to the matched identifier to the subsequent job; and updating the first data structure by computing for each sequence of text a lifespan parameter, the lifespan parameter for each sequence of text being computed based on a reuse factor of the sequence of text.

16. The non-transitory medium of claim 15, wherein the received source data is one of a text data of a book, and text data corresponding to genome data.

17. The non-transitory medium of claim 15, wherein each data-block is replicated three times, and the size of each data-block is one of 64 mega-bytes and 128 mega-bytes.

18. The non-transitory medium of claim 15, wherein the sequence of text is a DNA sequence.

19. The non-transitory medium of claim 15, wherein a size of the first data structure is fixed and the circuitry is further configured to maintain the fixed size of the first data structure by implementing a leaky-bucket algorithm.

20. The non-transitory medium of claim 15, wherein the reuse factor of the sequence of text corresponds to a number of times the sequence is used in a predetermined number of jobs, and wherein the lifespan parameter of the sequence of text is either increased or decreased in an exponential fashion.

* * * * *